United States Patent [19]
Alexander

[11] Patent Number: 5,526,545
[45] Date of Patent: Jun. 18, 1996

[54] AUTOMATIC RETURN TO DOCK MECHANISM

[75] Inventor: James C. Alexander, London, Canada

[73] Assignee: The Serco Corporation, London, Canada

[21] Appl. No.: 371,570

[22] Filed: Jan. 11, 1995

[51] Int. Cl.$^6$ .................................. E01D 1/00; E01F 1/00
[52] U.S. Cl. ................................... 14/71.3; 14/71.7
[58] Field of Search ......................... 14/71.1, 71.3, 14/71.7

[56] References Cited

U.S. PATENT DOCUMENTS

| | | | |
|---|---|---|---|
| 4,365,374 | 12/1982 | Bennett | 14/71.7 |
| 4,827,549 | 5/1989 | Walker | 14/71.7 |
| 4,944,062 | 7/1990 | Walker | 14/71.3 |
| 5,205,010 | 4/1993 | Hageman | 14/71.7 |
| 5,392,481 | 2/1995 | Hageman | 14/71.1 |
| 5,416,941 | 5/1995 | Hageman | 14/71.7 |

Primary Examiner—David J. Bagnell
Assistant Examiner—James A. Lisehora
Attorney, Agent, or Firm—Sughrue, Mion, Zinn, Macpeak & Seas

[57] ABSTRACT

A dock leveler comprising having a deck pivotally mounted for movement between a stored generally horizontal position and an operative position. A lip assembly is pivotally attached to one end of the deck and has a lip movable between an extended operative position and a stored pendant position. The deck is movable by hydraulic cylinder. A switch is mounted to the underside of the deck and to produce an output to control movement of the deck. A sensor arm is operably coupled to the lip assembly for limited movement relative to lip assembly movement. The sensor arm has one end positioned relative to the switch to cause the switch to produce a signal that starts operation of the hydraulic cylinder to move the deck thereby raising the deck and allowing said lip to fall. As the lip falls the one end of said sensor arm moves away from the switch such that the output thereof terminates operation of the hydraulic cylinder thus allowing the lip to fully retract prior to lowering of the deck.

20 Claims, 7 Drawing Sheets

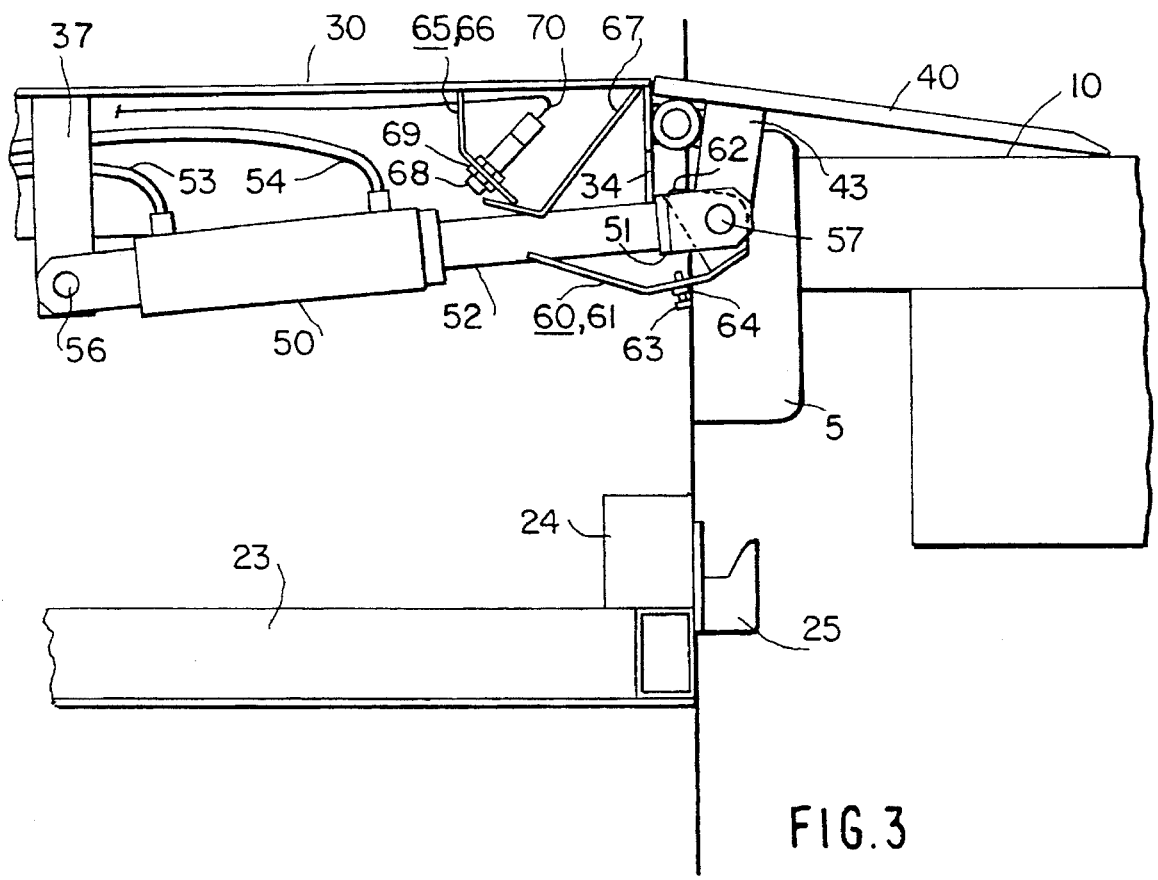
FIG.3
FIG.4
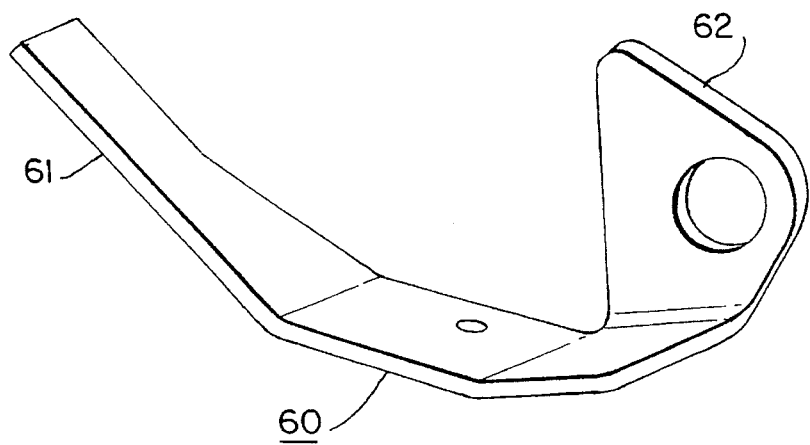

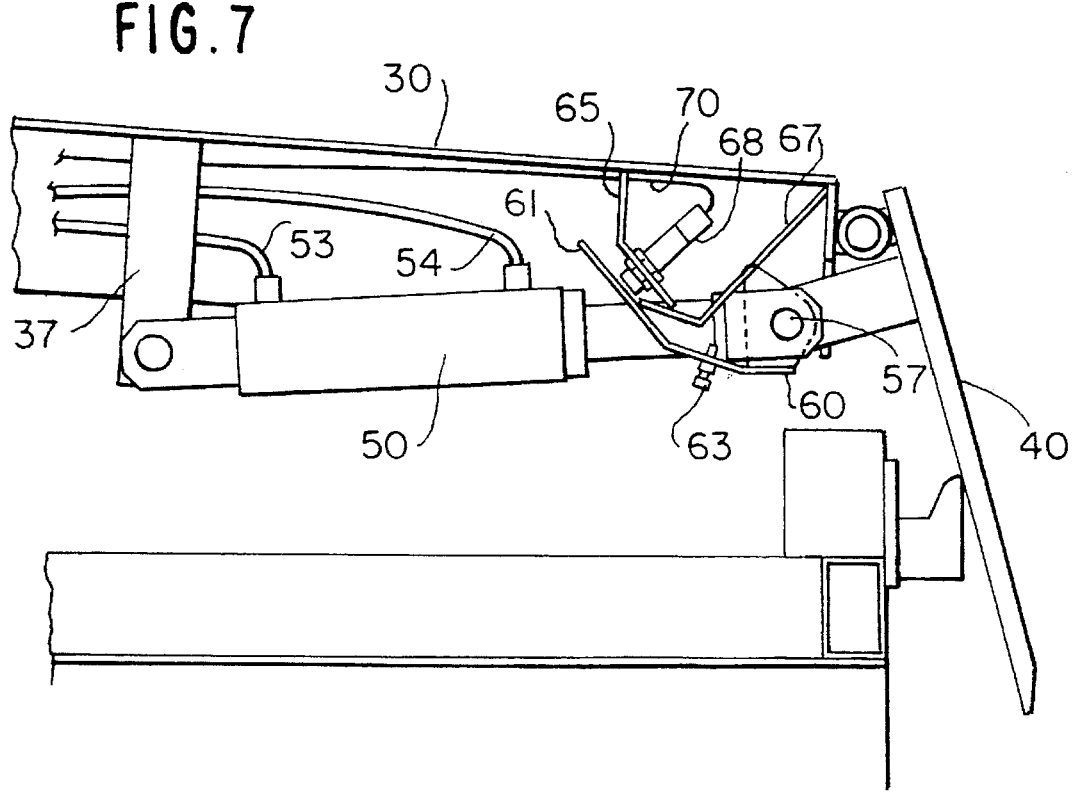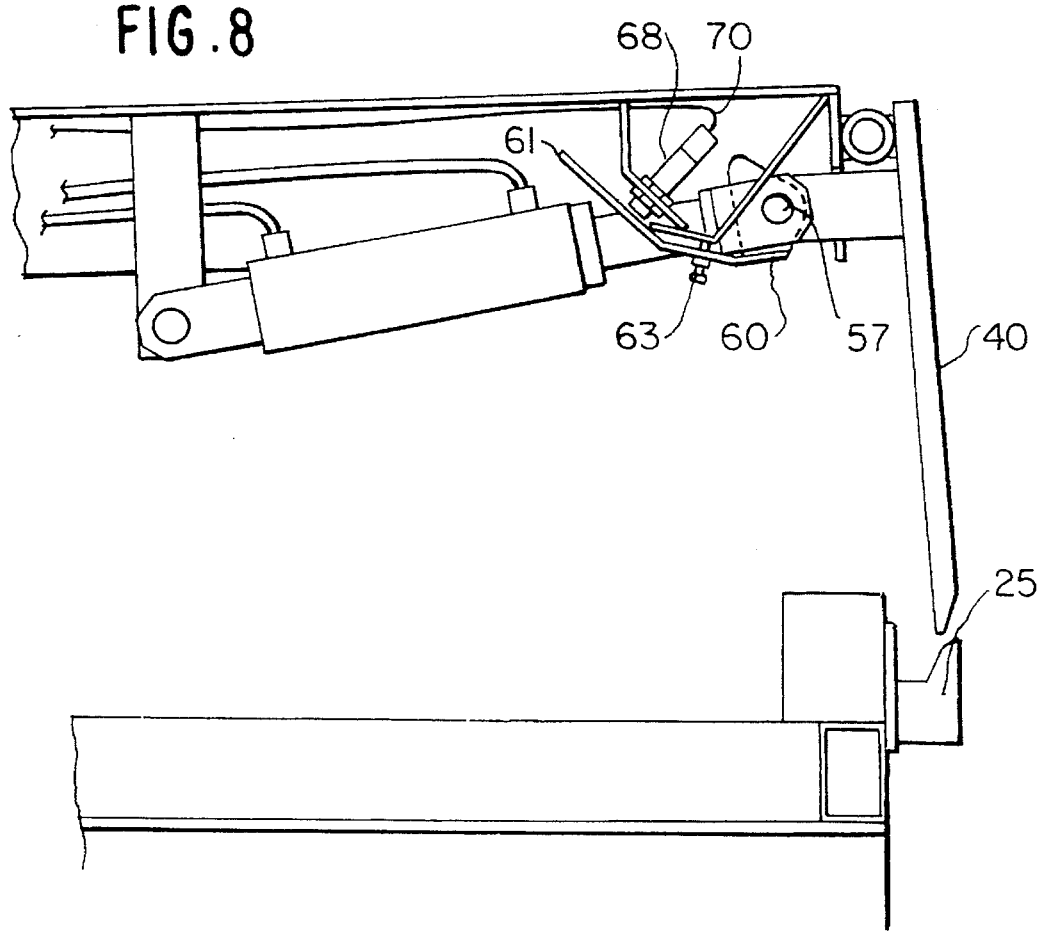

5,526,545

AUTOMATIC RETURN TO DOCK MECHANISM

BACKGROUND OF THE INVENTION

A conventional hydraulic dock leveler has a deck assembly which stores horizontally, that is level with the dock floor, and a pivoting lip attached at one end which extends outward to rest on the vehicle which is being loaded. When the dock leveler is stored, the lip pivots to a pendant position with the end of the lip resting in lip keepers mounted on the stationary frame to thereby support the front of the deck assembly in the stored position. Usually the dock operator will return the dock leveler to the stored position when a loading operation is completed. However, if the truck should pull away from the dock before the leveler is restored, some dock levelers have an optional feature which will automatically raise the dock leveler and return it to the stored position. Conventional automatic-return-to-dock mechanisms use several different techniques. One technique uses a mechanical limit switch to sense the extension of the lip hydraulic cylinder to determine the lip position. Although effective when working properly, it is difficult to adjust and is subject to the reliability problems common to mechanical switches. An other system uses two switches, one on the deck and one on the lip, to control the automatic-return-to-dock function. However a switch mounted on the lip is more exposed to damage by the vehicle being loaded, and the rotation of the lip can cause fatigue failure of the wires to the switch. Yet another system uses a proximity switch to sense when the deck is lowered to the frame and a timer to control the hydraulic motor. Since it does not directly sensing lip position this method cannot ensure that the lip is fully closed or that the deck raised sufficiently before the hydraulic system is turned off.

SUMMARY OF THE INVENTION

Given the deficiencies of these prior art systems, it is an object of this invention to provide for an improved automatic return to dock mechanism that is reliable and employs a minimum number of parts. This invention is an improved automatic-return-to-dock control which uses a proximity switch to sense the position of the lip and control the hydraulic power unit. The hydraulic power unit continues to run until the lip is fully retracted. The mechanism has only one moving part which is attached directly to the lip assembly and is easily adjusted by means of a single screw. This invention employs a stationary proximity switch together with a sensor arm having a variable relationship with both the lip and the proximity switch. When the lip is fully retracted the sensor arm is moved to disengage the proximity switch. The proximity switch remains disengaged as the lip extends. However when the lip approaches the point of full extension the sensor arm is moved to a position where it will engage the proximity switch after the lip has later moved to a position of being partially retracted. The sensor arm then continues to engage the proximity switch until the lip is fully retracted.

In a first embodiment of this invention the proximity switch directly senses the lip position. This embodiment reduces the number of parts, is easier to adjust and less likely to be affected by wear of the cylinder pivot pins. In a second embodiment the proximity switch is directly attached to the lip cylinder as opposed to the lip assembly itself. This embodiment is adaptable to a variety of lip and cylinder configurations.

This invention will be described in greater detail by referring to the attached drawing and the description of the preferred embodiments which follow.

BRIEF DESCRIPTION OF THE DRAWING

FIG. 3 is an enlarged sectional view of FIG. 2 illustrating details of the construction of the components;

FIG. 4 is a perspective view of the sensor arm;

FIG. 7 is a sectional view of the first preferred embodiment illustrating the deck assembly raising and the lip retracting;

FIG. 8 is a sectional view of the first preferred embodiment illustrating the lip raised clear of lip keepers and switch starting to disengage;

DESCRIPTION OF THE PREFERRED EMBODIMENTS

Figure 1:
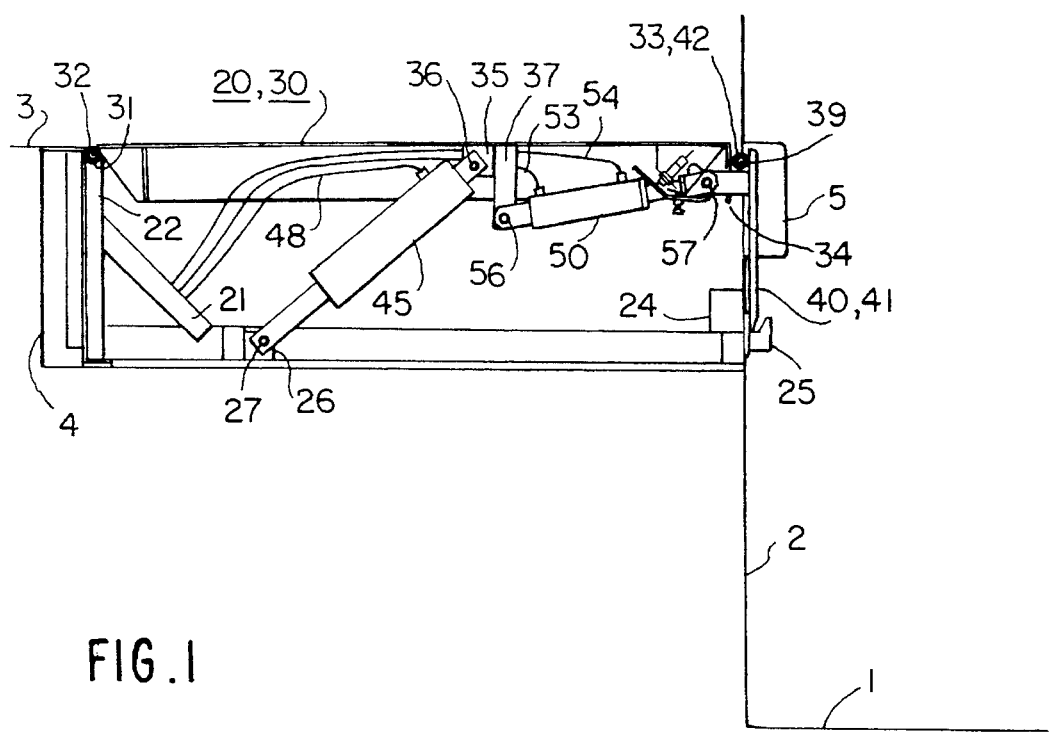
FIG. 1 is a side view of a dock leveler with the lip in the pendant position illustrating a first embodiment of this invention.

Referring now to FIG. 1 a side view of a loading dock is illustrated which has a driveway surface 1, a dock face 2 and a dock floor 3. A pit 4 is formed in the dock floor. Dock bumpers 5 limit the position of the transport vehicle 10. A dock leveler 20 has a frame assembly 21 mounted in the pit. The frame assembly has vertical back frame members 22 with holes for the hinge pivot pin near the top. Horizontal frame members 23 extend forward to the front of the pit 4 and have ramp stops 24 and lip keepers 25. A deck assembly 30 has rear hinge supports 31. The deck assembly 30 is attached to the frame assembly 21 by means of a hinge pin 32. Lip hinge tubes 33 are fastened to the front bar 34 of the deck assembly. A lip assembly 40 includes a lip plate 41 and hinge tubes 42, and is connected to the deck hinge tubes by a lip hinge pin 39. A lip arm 43 is integral with the lip plate 41. The end of the lip rests in the lip keepers 25 and supports the deck assembly in the stored "cross-traffic" position.

A hydraulic cylinder 45 is fastened to brackets 26 on the frame assembly 21 by a pin 27 and to brackets 35 on the deck assembly by a pin 36. A hose 48 carries hydraulic fluid from the hydraulic power unit (not shown) to the cylinder 45. A lip cylinder 50 is fastened to bracket 37 on the deck assembly by a pin 56. Hoses 53 and 54 carry hydraulic fluid from the hydraulic power unit (not shown) to the cylinder 50. As illustrated in FIG. 3, clevis 51 is attached to the extendible rod 52 of lip cylinder and is attached to the arm 43 of the lip assembly 40 by a pin 57.

Figure 2:
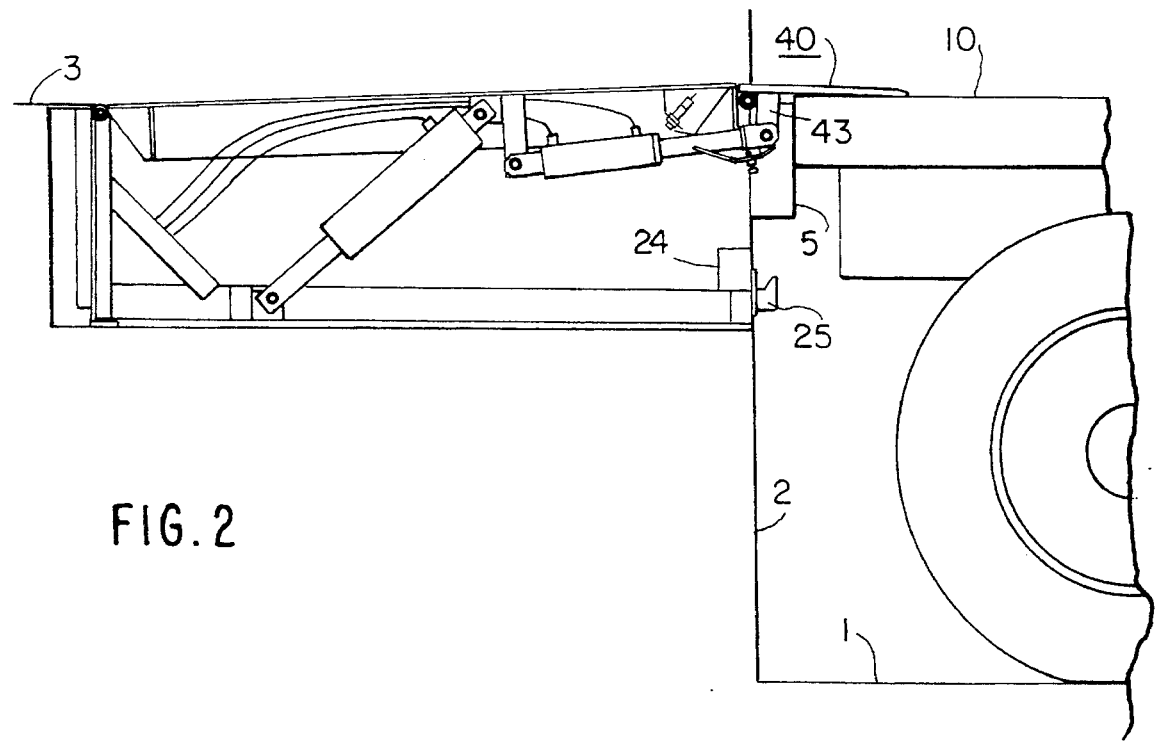
FIG. 2 is a side view of the first embodiment illustrating the lip extended on to a vehicle.
Figure 5:
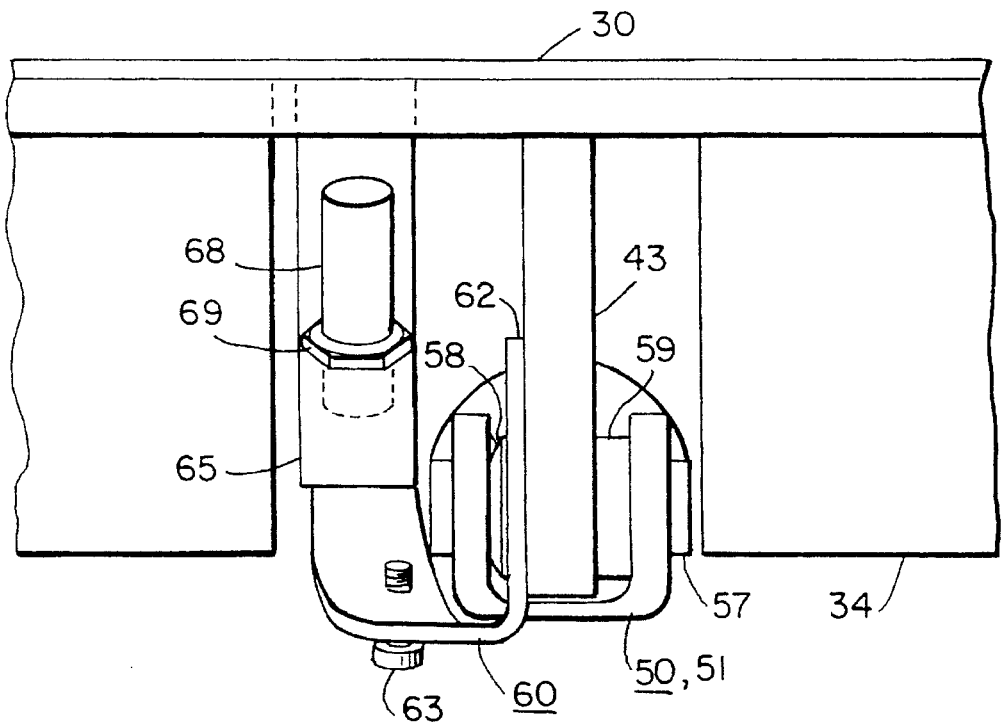
FIG. 5 is a front view of the first preferred embodiment.

FIG. 2 illustrates the dock leveler slightly elevated with the lip extended and resting on the bed of a vehicle 10. FIG. 3 is an enlarged portion of the view in FIG. 2 showing the configuration of the proximity switch and sensor bracket mounting. A bracket assembly 65 has a switch mounting bracket 66 and a guide bracket 67. A proximity switch 68 is attached to the mounting bracket 66 with two nuts 69. An electrical cable 70 carries the signal from the proximity switch 68 to the control panel (not shown). FIGS. 3, 4 and 5 illustrate the sensor bracket 60 which has an elongated arm 61 and an upwardly extending flange 62. As shown in FIG. 5, the flange 62 is carried on the pin 57 and is held in contact with the lip arm 43 by the spring washer 58. A spacer 59 positions the lip arm 43 between the flanges of the lip cylinder 50. The arm 61 is offset from the lip cylinder 50 so that the cylinder 50 does not interfere with the path of the arm 61.

Figure 6:
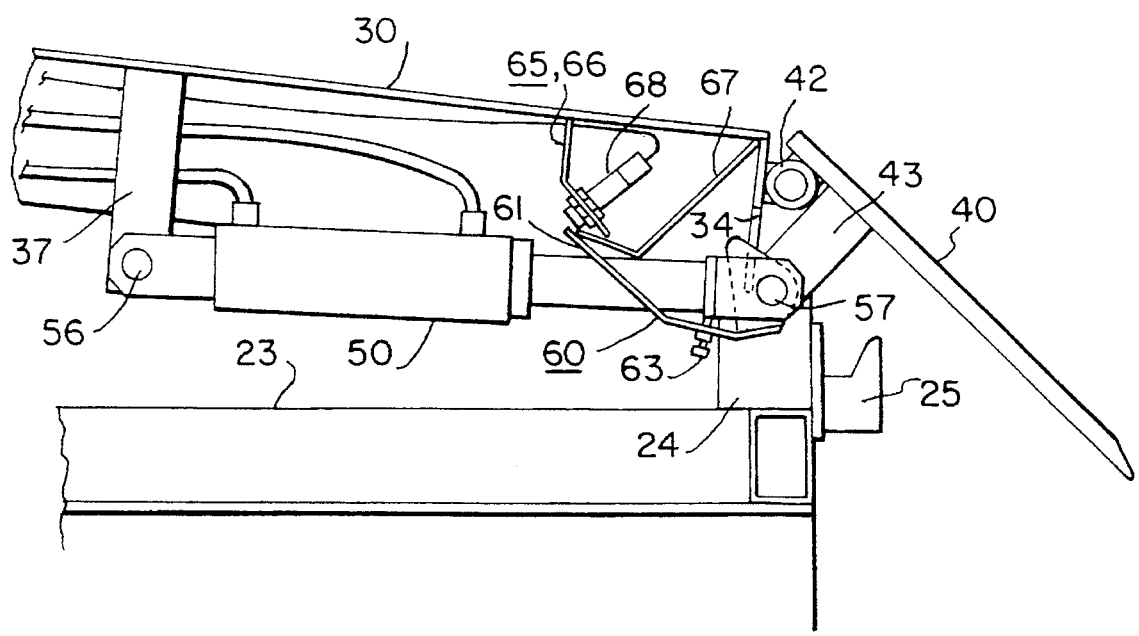
FIG. 6 is a sectional view of the first embodiment illustrating the deck assembly lowered to the frame and lip partially lowered with the sensor arm starting to engage the proximity switch.

During normal loading operations the lip assembly 40 is extended and resting on the bed of the truck 10 as shown in FIG. 3. If the truck pulls away from the dock before the leveler is restored to dock level, the deck assembly 30 will fall to a below dock position until the bottom of the front header bar 34 rests on top of the ramp stops 24. In that position, when hydraulic pressure is removed from the deck cylinder 45, the lip cylinder 50 is allowed to retract and the lip will begin to fall as shown in FIG. 6. The spring washer 58 urges the flange 62 of the sensor bracket 60 against the lip arm 43 and friction will cause the sensor bracket 60 to rotate with the lip 40 until the end of the arm 61 contacts the guide bracket 67. This is illustrated in FIG. 6.

Figure 9:
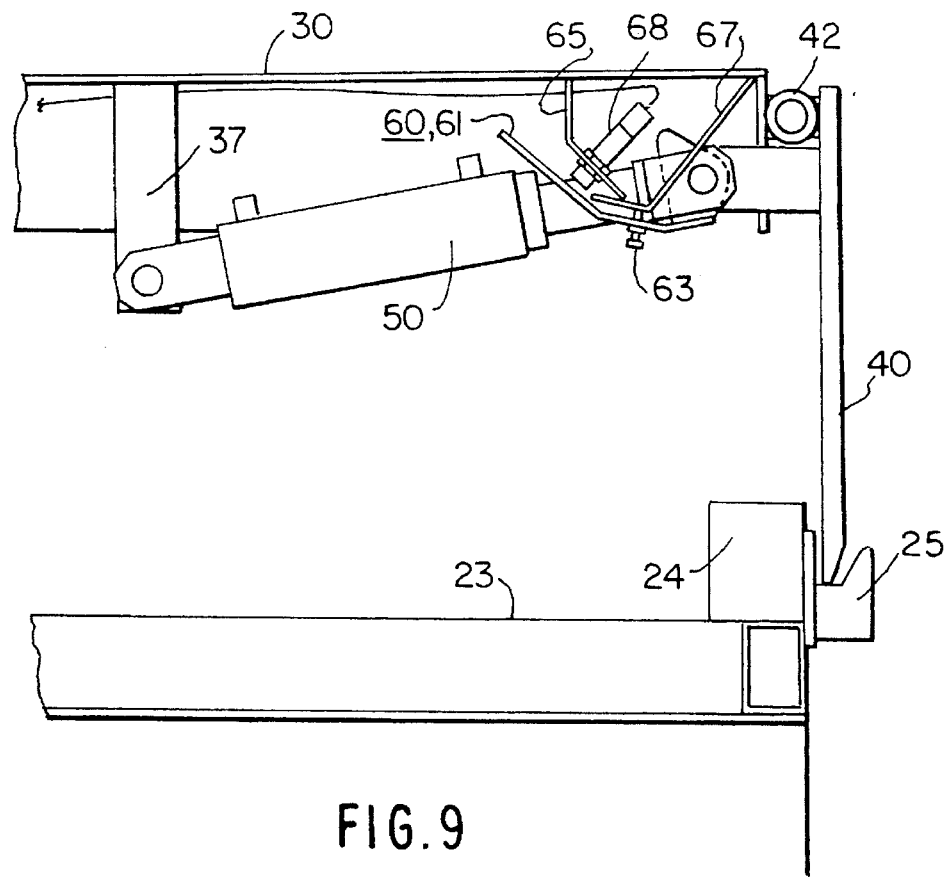
FIG. 9 is a sectional view of the first preferred embodiment illustrating the lip fully retracted and the proximity switch disengaged.

When the proximity switch 68 senses the end of the arm 61, the hydraulic power unit will start, causing the deck assembly 30 to raise and the lip assembly 40 to further retract. As the lip continues to rotate as shown in FIG. 7, the guide bracket 67 will keep the end of the arm 61 a predetermined distance from the end of the proximity switch 68 and the hydraulic power unit will continue to operate. The lip cannot fully retract until it has been raised above the lip keepers 25 as shown in FIG. 8. As the lip approaches full retraction, the end of the adjustment screw 63 contacts the guide bracket 67. As the lip continues to retract, the screw 63 causes the sensor bracket to rotate counterclockwise away from the end of the proximity switch 68. When the proximity switch fails to sense the sensor bracket, the hydraulic power unit stops and the dock leveler falls to the stored position with the end of the lip 40 resting in the lip keepers 25 as shown in FIG. 9.

Figure 10:
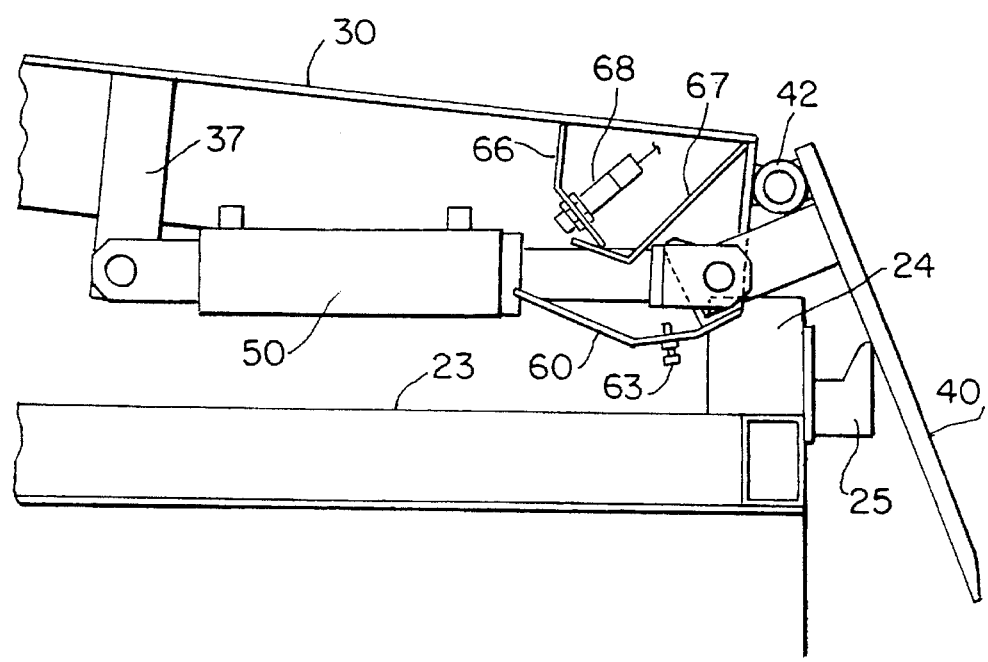
FIG. 10 is a sectional view of the first preferred embodiment illustrating the deck lowered for end loading.

Although the automatic-return-to-dock mechanism will cause the leveler to restore if the truck leaves as described above, the dock leveler must be able to perform "below dock end loading" without causing the hydraulic power unit to start. This condition is shown in FIG. 10 where the lip is extended slightly to clear the lip keepers 25 and the deck assembly 30 is lowered until the front header bar 34 rests on the ramp stops 24. Because the sensor bracket 60 rotates with the lip assembly 40, the proximity switch is not engaged when in the position shown in FIG. 10.

If the lip is extended further the end of the flange 62 will contact the back surface of the clevis 51 on the lip cylinder 50 and will prevent the sensor bracket from continuing to rotate with the lip assembly 40. Therefore as the lip becomes almost fully extended the position of the sensor bracket 60 will have rotated relative to the lip arm so that it will engage the proximity switch 68 when the lip has partially retracted as shown in FIG. 6.

Figure 11:
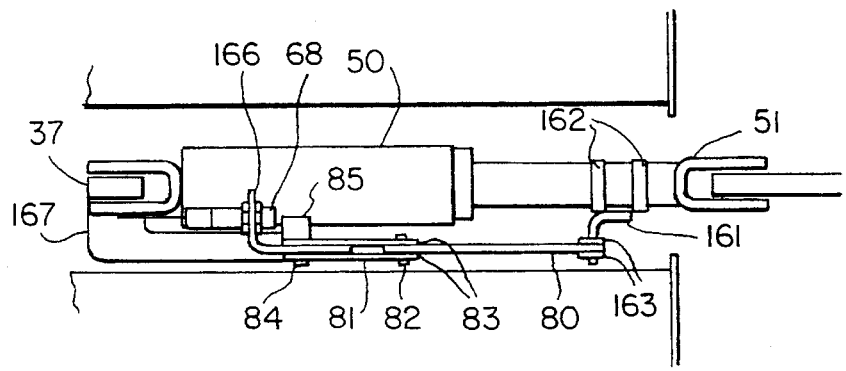
FIG. 11 is a cut-away top view illustrating a second preferred embodiment of this invention.
Figure 12:
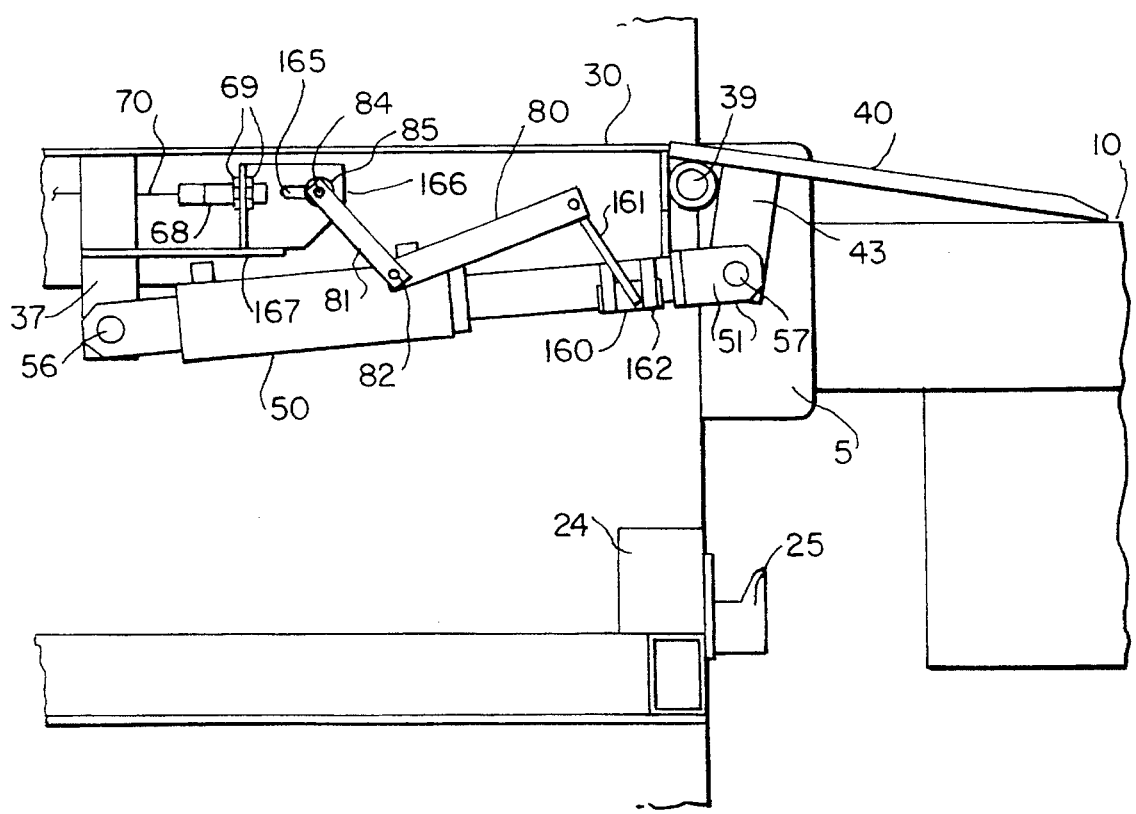
FIG. 12 is a sectional view of the second preferred embodiment illustrating the lip extended.
Figure 13:
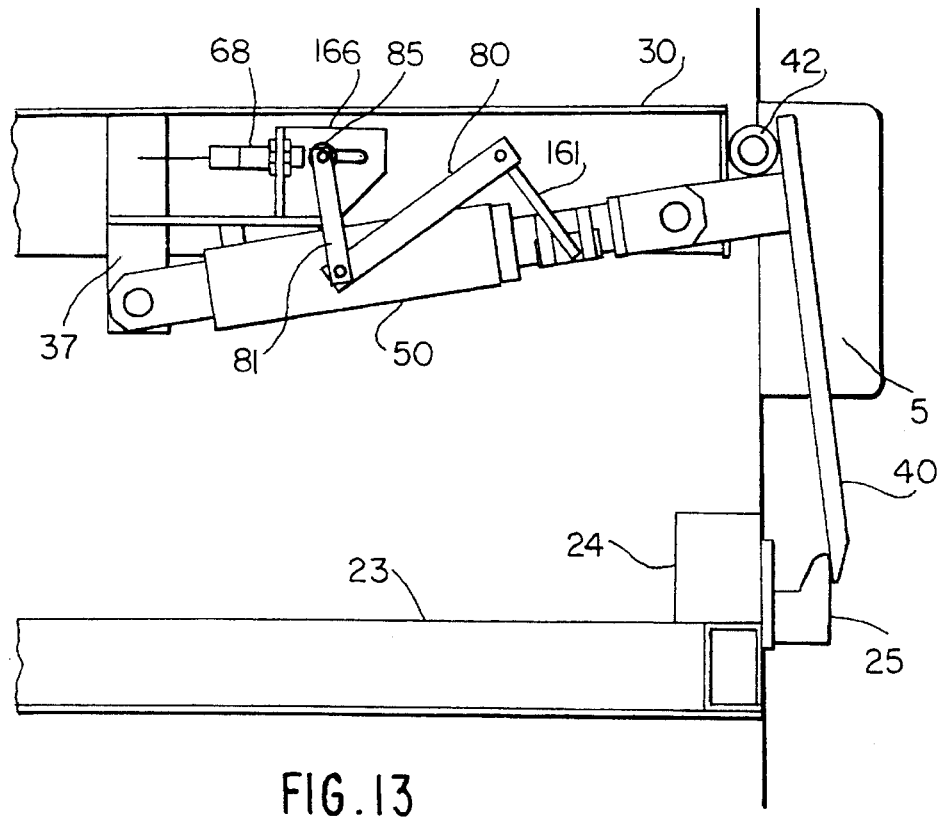
FIG. 13 is a sectional view of the second preferred embodiment illustrating the lip raised clear of the lip keepers and the switch starting to disengage.

FIGS. 11 and 12 illustrate a second preferred embodiment of this invention. Components common to the first preferred embodiment will be given the same numerals. These figures illustrate top and side views of the dock leveler with the lip extended and resting on the bed of a vehicle 10. A bracket assembly has a switch mounting angle bracket 166 and a base plate 167. A proximity switch 68 is attached to the mounting angle bracket 166 with two nuts 69. An electrical cable 70 carries the signal from the proximity switch 68 to the control panel (not shown). A bracket assembly 160 has an angled rod 161 and is attached to the rod 52 of the lip cylinder 50 by two clamps 162. A bar 80 has one end pivoting on the rod 161 and positioned between the flanges 163. The other end of the bar 80 is fastened between two lever arms 81 by the rivet 82. A spring washer 83 is trapped between each lever arm 81 and the bar 80 and provides friction to resist rotational movement between the bar 80 and the lever arms 81. The other ends of the lever arms 81 pass on either side of the front flange of the mounting angle 165 and are joined by a pin 84 which is guided by a slot 165 in the flange of the angle 166. A boss 85 is mounted on the pin 84 to act as a sensor for the proximity switch 68.

Figure 14:
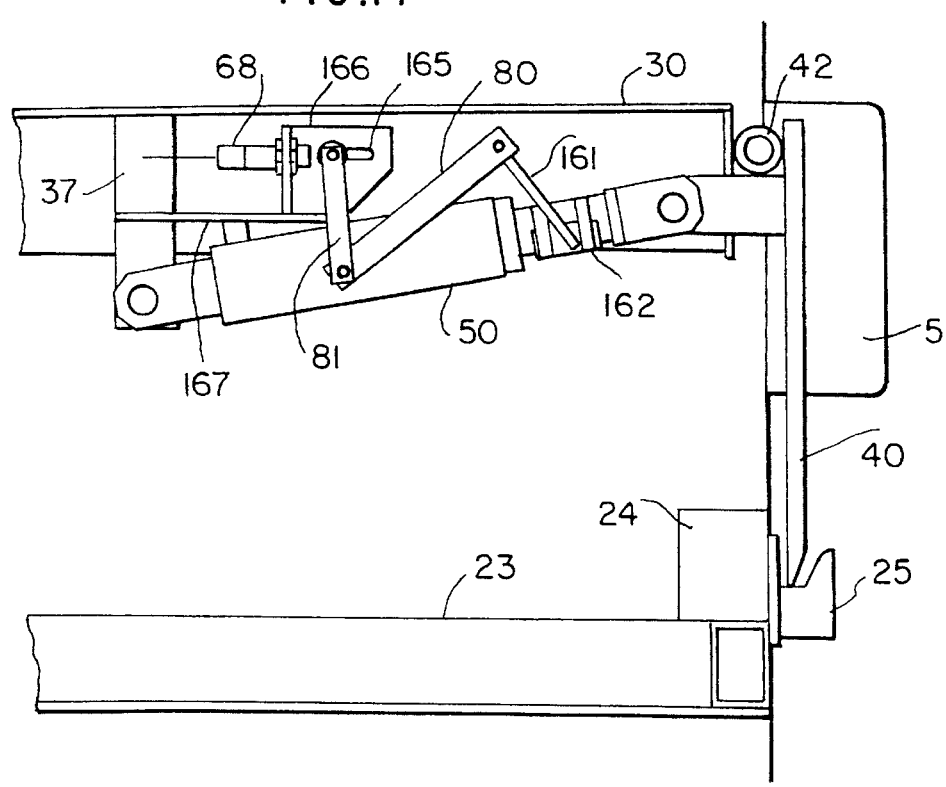
FIG. 14 is a sectional view of the second preferred embodiment of the invention illustrating the lip fully retracted and proximity switch disengaged.

When the lip assembly 40 starts to fall and the lip cylinder rod 52 starts to retract, the pin 84 will move rearward in the slot 165 in the mounting angle bracket 166. The proximity switch 68 will sense the boss 85 and the hydraulic power unit will start, causing the deck assembly 30 to raise and the lip assembly 40 to further retract. As the lip continues to rotate the lever arms 81 will rotate relative to the bar 80 to maintain the position of the boss 85 at the end of the proximity switch 68. The hydraulic power unit will continue to operate. As in the first embodiment (FIGS. 7–8), the lip cannot fully retract until it has been raised above the lip keepers 25. As the lip approaches full retraction the lever arms 81 will contact the front edge of the base plate 167. As the lip continues to retract, the bar 80 will continue to push the bottom of the lever arms 81 rearward, causing the lever arms to rotate clockwise about the front edge of the base plate 167 and cause the boss 85 to move forward away from the end of the proximity switch 68, as shown on FIG. 14. When the proximity switch fails to sense the boss 85, the hydraulic power unit will stop and the dock leveler will fall to the stored position, as illustrated. Thus the function of the second preferred embodiment is similar to the first preferred embodiment.

As set forth herein the advantages of the first preferred embodiment are fewer components and easier adjustment. Because the sensor arm is attached directly to the lip arm, it is less prone to losing adjustment from wear of pivot pins. The advantages of the second preferred embodiment are that it can be more easily adapted to various configurations of lips and cylinders.

It is apparent that modifications of this invention can be practiced without departing from the essential scope thereof. For example, while the power for the deck and lip is described as a common hydraulic power source driving the two cylinders, it is apparent that each of the cylinders could be independently driven by its own source.

I claim:

1. A dock leveler comprising; a deck pivotally mounted for movement between a stored generally horizontal position and an operative position; a lip assembly having a lip pivotally attached to one end of the deck; means to move said lip between an extended operative position and a stored pendant position; means to move said deck; a switch mounted to said deck and producing an output to control said means to move said deck, a sensor arm operably coupled to said lip assembly for limited movement relative to lip assembly movement, said sensor arm having one end positioned relative to said switch to cause said switch to produce a signal that starts operation of said means to move said deck thereby raising said deck and allowing said lip to fall, and as said lip falls said one end of said sensor arm moves away from said switch such that the output thereof terminates operation of said means to move said deck thus allowing said lip to fully retract prior to lowering of said deck.

2. The dock leveler of claim 1, further comprising a guide bracket mounted to said deck and having a portion contacting said one end of said sensor arm to position it relative to said switch.

3. The dock leveler of claim 1 further comprising an adjustment screw mounted to said sensor arm and movable to vary the distance between said sensor arm and said guide bracket.

4. The dock leveler of claim 1 wherein said sensor arm comprises a member mounted for rotational movement on said lip assembly, said sensor arm having an upwardly extending flange to contact a portion of said lip assembly and a spring to bias said sensor arm such that said flange contacts said lip assembly.

5. The dock leveler of claim 4 wherein said lip assembly comprises a lip arm fixed to said lip and said flange contacts said arm.

6. The dock leveler of claim 1 wherein said means to move said lip comprises a lip cylinder and an extensible rod, and wherein said sensor arm is operably coupled to said said lip assembly by having a portion coupled to said extensible rod for movement as said extensible rod moves.

7. The dock leveler of claim 6 further comprising a bracket mounting said switch and having a guide for said one end of said sensor arm, wherein said sensor arm comprises a pivoting lever assembly, and said one end is mounted in said guide for linear movement relative to said switch as said extensible arm moves to position said lip.

8. The dock leveler of claim 1, wherein means to move said lip assembly comprises an hydraulic cylinder and an extensible piston rod to move said lip, and wherein said sensor arm comprises a member coupled at one end thereof to said extensible piston rod, a slot fixedly positioned proximate to said switch, the other end of said sensor arm mounted in said slot so that movement of said rod to raise or lower the lip is sensed by the relative position of said other end of said sensor arm relative to said switch.

9. The dock leveler of claim 1 wherein said switch comprises a proximity sensor, further comprising a bracket mounted on the underside of said deck, said proximity sensor positioned in said bracket.

10. The dock leveler of claim 9 wherein said bracket further comprises a guide plate having a slot therein, and one end of said sensor arm being mounted in said slot.

11. The dock leveler of claim 1, wherein means to move said lip assembly comprises an hydraulic cylinder and an extensible piston rod to move said lip, and wherein said sensor arm comprises a member coupled at one end thereof to said extensible piston rod, a slot fixedly positioned proximate to said switch the other end of said sensor arm mounted in said slot so that movement of said rod to raise or lower the lip is sensed by the relative position of said other end of said sensor arm relative to said switch.

12. A dock leveler comprising; a frame positioned in a pit at a loading dock, a deck pivotally mounted to said frame for movement between a stored generally horizontal position and an operative position; a lip assembly including a lip pivotally attached to one end of the deck; means to move said lip between an extended operative position and a stored pendant position; hydraulic means to move said deck; a switch mounted to said deck and producing an output to control said hydraulic means to move said deck, a sensor arm operably coupled to said lip assembly for limited movement relative to lip assembly movement, said sensor arm having one end positioned relative to said switch to cause said switch to produce a signal that starts operation of said hydraulic means to move said deck thereby raising said deck and allowing said lip to fall, and as said lip falls said one end of said sensor arm moves away from said switch such that the output thereof terminates operation of said hydraulic means to move said deck thus allowing said lip to fully retract prior to lowering of said deck.

13. The dock leveler of claim 12, further comprising a guide bracket mounted to said deck and having a portion contacting said one end of said sensor arm to position it relative to said switch.

14. The dock leveler of claim 13 further comprising an adjustment screw mounted to said sensor arm and movable to vary the distance between said sensor arm and said guide bracket.

15. The dock leveler of claim 12 wherein said sensor arm comprises a member mounted for rotational movement on said lip assembly, said sensor arm having an upwardly extending flange to contact a portion of said lip assembly and a spring to bias said sensor arm such that said flange contacts said lip assembly.

16. The dock leveler of claim 15 wherein said lip assembly comprises a lip fixed to said lip and said flange contacts said arm.

17. The dock leveler of claim 12 wherein said means to move said lip comprises a hydraulic lip cylinder and an extensible rod, and wherein said sensor arm is operably coupled to said lip assembly by mounting to said extensible rod for movement as said extensible rod moves.

18. The dock leveler of claim 17 further comprising a bracket mounting said switch and having a guide for said one end of said sensor arm, wherein said sensor arm comprises a pivoting lever assembly, and said one end is mounted in said guide for linear movement relative to said switch as said extensible arm moves to position said lip.

19. The dock leveler of claim 12 wherein said switch comprises a proximity sensor, further comprising a bracket mounted on the underside of said deck, said proximity sensor positioned in said bracket.

20. The dock leveler of claim 19 wherein said bracket further comprises a guide plate having a slot therein, and one end of said sensor arm being mounted in said slot.

* * * * *